United States Patent
Mavrakis

[15] 3,672,548
[45] June 27, 1972

[54] TACKLE BOX

[72] Inventor: Gus H. Mavrakis, 135 Burlington Ave., Billings, Mont. 59102

[22] Filed: April 5, 1971

[21] Appl. No.: 131,038

[52] U.S. Cl. ..........................................................224/5 G
[51] Int. Cl. .......................................................A45c 11/00
[58] Field of Search .....................312/284, 327, 328; 108/63; 224/42.08, 42.4, 42.44, 5 R, 5 G

[56] References Cited

UNITED STATES PATENTS 3,151,790  10/1964  Mavrakis ................................224/5 G
2,999,621  9/1961   Kiser........................................224/5 G

*Primary Examiner*—Gerald M. Forlenza
*Attorney*—Kimmel, Crowell & Weaver

[57] ABSTRACT

An improved tackle box adapted to be supported on the front of the user by means of shoulder straps is disclosed. The tackle box comprises three basic component parts. These include (1) a receptacle having a number of partitioning walls (2) a support member in the form of an outer cover for said receptacle and (3) a combined shelf and supplemental cover for said receptacle. The front wall of the receptacle includes a forwardly extending offset position that cooperates with the side and front wall of the shelf to provide a tray having continuous, upstanding side walls. The offset portion of the front wall of the receptacle also serves as stop means for limiting the pivotal travel of the shelf. The tackle box is sturdy and durable in construction, yet is relatively simple and easy to manufacture.

6 Claims, 6 Drawing Figures

PATENTED JUN 27 1972 3,672,548

INVENTOR
GUS H. MAVRAKIS
BY
Kimmel, Crowell & Weaver
ATTORNEYS

TACKLE BOX

This invention relates to a tackle box and more particularly to an improved tackle box that is adapted to be supported and worn by the user.

As is well known, tackle boxes are used by fishermen as containers for articles such as lures, weights, plugs, swivels, bobbers and the like. While a large number of tackle boxes, of varying designs, are commercially available, a particularly advantageous tackle box is disclosed in U.S. Pat. No. 3,151,790 which issued Oct. 6, 1964. In this patent there is disclosed a tackle box that is adapted to be supported on the front of the fisherman by means of shoulder straps so that the box is in a readily accessible position. The tackle box is sturdy and durable in construction, yet is relatively simple and easy to manufacture.

In summary, the present invention is an improvement over the tackle box disclosed by the above noted U.S. patent. While the product disclosed by said patent is an advance in the art, in accordance with the present invention there is provided, as will be discussed in detail hereinbelow, a unique tackle box having particularly advantageous and improved structural features and elements. In its broadest aspects, the tackle box of the invention comprises three basic elements or component parts. These include (1) a receptacle having a number of partitioning walls or means which divide the interior of the receptacle into multiple compartments (2) a support member in the form of an outer cover for said receptacle and (3) an improved combined shelf and supplemental cover for said receptacle.

It is accordingly a general object of the invention to provide a new and improved tackle box that is supported on the front of the user and which may be readily opened and closed while in the worn position.

Another and more particular object of the invention is to provide a new and improved tackle box that is light weight and relatively inexpensive, yet is sturdy in construction and highly efficient in operation.

Yet another object is to provide a tackle box of the character which may be worn by the user in a readily accessible position so that access thereto involves a minimum of effort and difficulty.

A further object is to provide a tackle box construction having a multiple compartment receptacle, an improved support member in the form of an outer cover for said receptacle and an improved combined shelf and supplemental cover for said receptacle.

The manner in which the foregoing and other objects are achieved in accordance with the present invention will be better understood in view of the following detailed description and accompanying drawings which form a part of the specification, and wherein.

Figure 1:
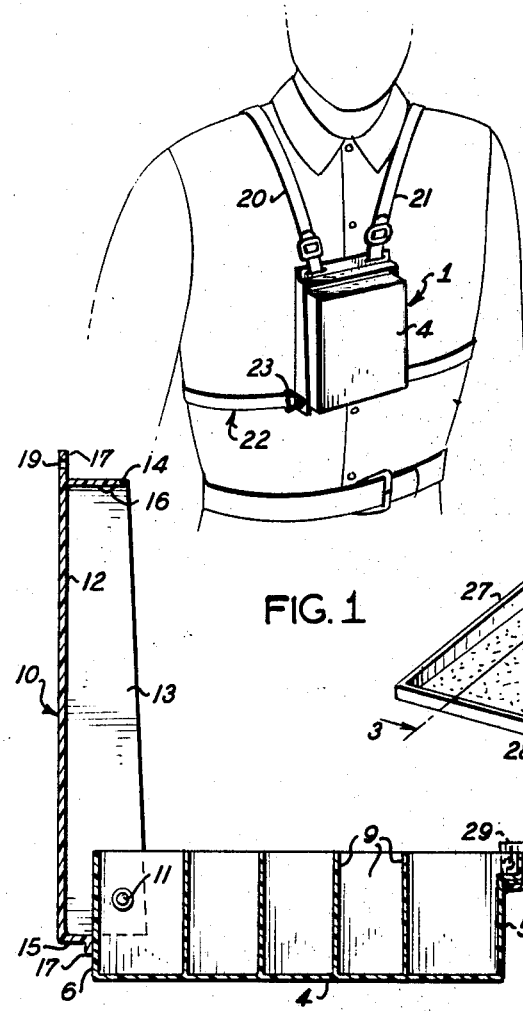
FIG. 1 is a pictorial view illustrating the improved tackle box of the present invention nd the manner in which it is supported on the front of the user.
Figure 2:
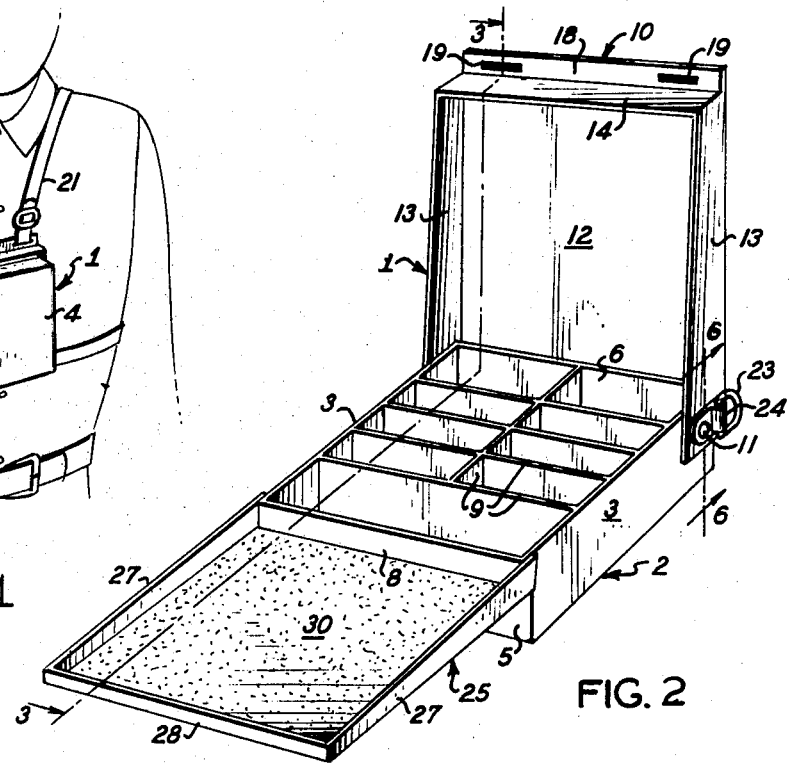
FIG. 2 is a front perspective view of the tackle box in its open position.
Figure 3:
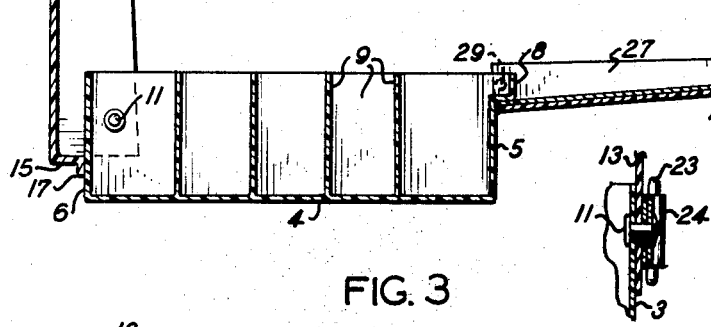
FIG. 3 is a sectional view taken along lines 3—3 of FIG. 2.

Turning now to the drawings in detail and first to FIGS. 1–3, there is shown a particularly advantageous embodiment of the present invention. As best illustrated in FIGS. 2 and 3, the tackle box, indicated generally at 1, comprises a box-like container or receptacle 2 having side walls 3, a bottom wall 4 and front and rear walls, 5 and 6 respectively. As shown, the side walls include forwardly projecting wall portions 7, located adjacent the front, upper edge thereof and which extend beyond the main wall positions of said side walls. The front wall 5, in turn, has a mating, forwardly offset upper end 8 connected to the forwardly extending side wall portions 7. It will be seen that the front, rear and side walls are thus of the same height.

With reference again to FIGS. 2 and 3, the interior of the receptacle 2 is divided into a plurality of compartments by way of substantially vertical partitioning elements or walls, indicated generally at 9. Such elements provide a tackle box that is particularly suited to contain articles or objects, such as lures, weights, etc. The partitioning elements 9 may be integral with the receptacle 2, i.e., secured or molded integral with the side walls, or may comprise individual, removable and/or interlocking elements in a manner known in the art. The size and/or shape of the multiple compartments may be varied as desired.

Figure 5:
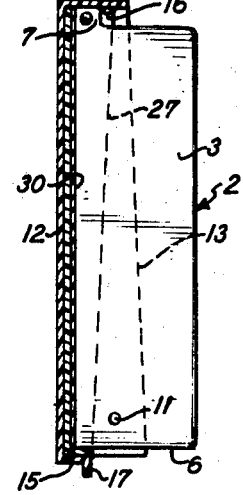
FIG. 5 is a view similar to that shown in FIG. 4 but in a closed position, as it would be worn by the user.

Turning now to FIGS. 2–5, it will be seen that the tackle box of the present invention includes a support member, indicated generally at 10, which also serves as an outside cover for the receptacle 2. The support member, which is pivotally mounted or secured to the receptacle 2 by pivot pins 11, include a top, support wall 12, side walls or flanges 13 and front and rear walls 14 and 15 respectively. As best seen in FIG. 5, the front wall 14 projects downwardly below the forwardly extending side and front wall portions (7 and 8) of the receptacle 2 and includes latch or shoulder means 16. Such means bear against the lower surface of the projecting wall portion 8 and prevent inadvertent opening of the tackle box.

The rear wall 15 of the support member or outer cover 10 includes, and terminates at, a stop flange 17 which serves to limit the movement of the receptacle beyond a horizontal position as shown in FIG. 3. The stop flange is, of course, perpendicular to the rear wall 15, and may be integral therewith or may be a separate member, secured to the rear wall as by screws, etc.

Figure 6:
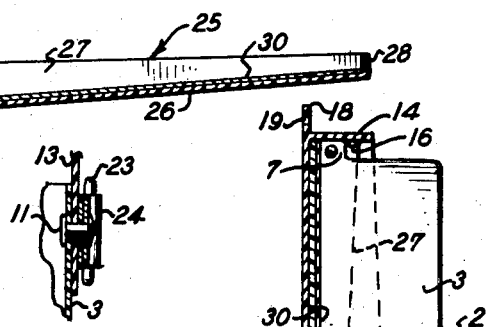
FIG. 6 is a sectional view taken along lines 6-6 of FIG. 2.
Figure 4:
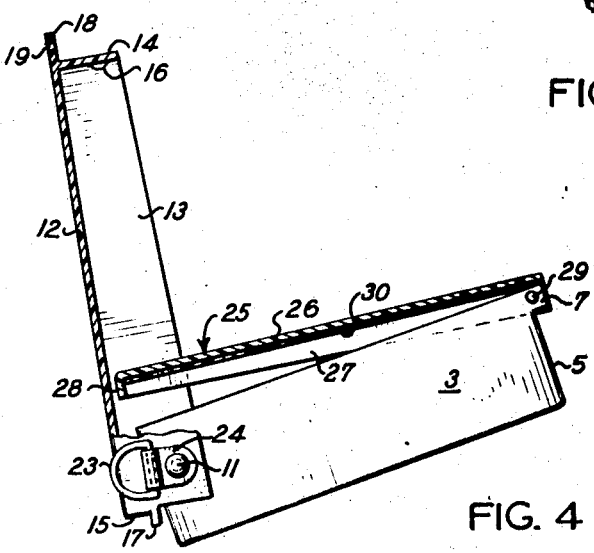
FIG. 4 is a view, partially in section, of the tackle box in a half opened position.

The top support wall 12, as best shown by FIGS. 2 and 3, has an upwardly extending extremity 18 that extends beyond the front wall 14 and which includes openings or slots 19. The openings 19 are adapted to receive fasteners or other securing means carried at the extremities of shoulder straps 20 and 21 that are worn over the shoulders of the user as shown in FIG. 1. In this regard, and with reference to FIGS. 1 and 6, the opposite ends of a continuous strap 22 are secured to loop rings 23 which are in turn secured to the pivot pins 11 by way of joint connectors 24. As will be appreciated by those skilled in the art, such construction is simple to manufacture and yet is durable in nature. Further, since the loop rings 23 are pivotally mounted on the pivot pins 11, movement by the wearer is not restricted or limited nor will the continuous strap 22 tend to move due to such motion. The shoulder straps 20 and 21 are secured to the continuous strap 22 by suitable fasteners, etc., in a manner known in the art.

As briefly discussed above, the unique tackle box of the present invention also includes a combed shelf and supplemental cover indicated generally at 25. With reference to FIGS. 2 and 3 the combined shelf and supplemental closure member includes a shelf wall 26, side walls or flanges 27 and an end wall 28. The shelf 25 is pivotally mounted on the receptacle 2 by way of pivot pins 29 centrally mounted or disposed in the forwardly projecting side wall portions 7. As will be readily apparent, the closure member not only serves to prevent inadvertent disengagement of articles from the several compartments but also provides a shelf upon which the various articles e.g., lures, weights, etc., may be deposited during sorting or selection by the fisherman. Additionally a layer of cork 30, or like material, e.g., foamed polystyrene, of about one-eighth inch in thickness is preferably affixed to the area 26, as by glue or other means. Flys or like articles may be stuck into the cork 30 in the areas above the several compartments so that they will be readily available to the angler when the shelf 25 is in an open or extended position.

As shown in FIG. 3, the forwardly projecting or off-set front wall portion 8 serves as a stop means to prevent displacement of the shelf or cover beyond the horizontal when in its open position. In this regard, it should be noted that the forwardly offset front wall portion 8 cooperates with the side walls 27 and end wall 28 to provide, when the shelf is in its horizontal position, a tray or shelf having four upstanding sides to prevent the articles or objects on the tray from sliding off due to movement by the fisherman.

In the embodiments shown in the drawings, the side walls 27 are tapered such that the shelf wall 26 slopes toward the receptacle. Thus articles on the shelf will tend to move toward the front wall of the receptacle in the event that the tackle box is subjected to a sudden or unexpected motion. As shown, the side walls of the support member 10 may also be tapered to reduce the amount of material needed to construct same as well as to provide increased strength or rigidity of the walls.

The particular materials employed to construct the unique tackle box of the invention is not critical and may be selected, as is well known in the art, from light weight metals, plastics, etc. Preferably, the tackle box is produced from so-called "-high-impact" plastics, such as high-impact polystyrene. This material may be readily and inexpensively molded to form a desired product in a manner well known in the art. Such materials are also highly resistant and durable.

As will be readily apparent to those skilled in the art, the present invention provides a truly remarkable and improved tackle box that is simple in construction, relatively easy to manufacture, and yet is sturdy, durable and particularly adapted for its intended use. It should be noted e.g., that the side walls of the outer and supplemental cover members serve to prevent moisture e.g., rain, from entering the receptable, in addition to the above discussed functions. While particularly advantageous embodiments have been shown for illustrative purposes, it should be understood that various changes and modifications may be made without departing from the scope of the present invention, as defined by the appended claims.

What is claimed is:

1. A tackle box comprising a receptacle having bottom, front, rear and side walls, said side walls having forwardly extending wall portions that extend beyond the main portion of said side walls and are positioned adjacent the forward upper edge thereof, said front wall having a forwardly offset upper end connected to said forwardly extending side wall portions; means dividing said receptacle into a plurality of compartments; a support member in the form of an outer cover for said receptacle, said support member having top, front, rear and side walls, said rear wall of said support member terminating at a stop flange for engaging said rear wall of said receptacle to limit movement of said receptacle to a plane generally perpendicular to said support member; means pivotably connecting said side walls of said support member to said side walls of said receptacle at a point near the rear wall thereof; a combined shelf and supplemental cover having side walls, an end wall and a shelf wall connected to said side and end walls, means pivotably connecting said side walls of said shelf and supplemental said to aid forwardly projecting side wall portions of said receptacle for pivotal movement to a first position in which said shelf wall extends over said receptacle and to a second position in which said shelf wall extends generally in the same plane as said receptacle and whereby said end and side walls of said shelf cooperate with said forwardly offset front wall of said receptacle to provide a tray with upstanding sides; and strap means for securing said support member to the body of the user at a point adjacent the front of the user's waist.

2. The tackle box in accordance with claim 1 wherein said front wall of said support member projects downwardly below said forwardly offset upper end of said front wall of said receptacle and includes latch means to latch against said forwardly offset front wall portion.

3. The tackle box in accordance with claim 2 wherein the forward edge of said shelf wall of said combined shelf and supplemental cover engages said forwardly offset front wall portion of said receptacle to prevent pivotal movement of said shelf downwardly relative to a plane generally horizontal with said receptacle.

4. The tackle box in accordance with claim 3 wherein the side walls of said combined shelf and supplemental cover are tapered such that when said combined shelf and supplemental cover is in said second position, said shelf wall slopes toward said receptacle whereby objects on said shelf wall tend to move toward said receptacle.

5. The tackle box of claim 4 wherein said means for pivotably connecting said side walls of said support member to said side walls of said receptacle include loop means adapted to receive the opposed ends of a belt strap comprising said strap means.

6. The tackle box of claim 5 wherein a layer of a lightweight, porous material selected from the group consisting of cork and foamed plastics, is affixed to the shelf wall of said supplemental cover to form a top surface thereof when said shelf wall is in its second position.

* * * * *